United States Patent
Moriyama et al.

(10) Patent No.: US 10,436,613 B2
(45) Date of Patent: Oct. 8, 2019

(54) LINEAR MOTION AND ROTATION DETECTOR

(71) Applicant: Nidec Corporation, Kyoto (JP)

(72) Inventors: Katsuya Moriyama, Nagano (JP); Fusayoshi Aruga, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/759,848

(22) PCT Filed: Sep. 16, 2016

(86) PCT No.: PCT/JP2016/077535
§ 371 (c)(1),
(2) Date: Mar. 14, 2018

(87) PCT Pub. No.: WO2017/047781
PCT Pub. Date: Mar. 23, 2017

(65) Prior Publication Data
US 2018/0259366 A1  Sep. 13, 2018

(30) Foreign Application Priority Data
Sep. 18, 2015  (JP) .................................. 2015-185558

(51) Int. Cl.
*G01D 5/245* (2006.01)
*G01D 5/14* (2006.01)
*F16C 41/00* (2006.01)

(52) U.S. Cl.
CPC ......... *G01D 5/2452* (2013.01); *F16C 41/007* (2013.01); *G01D 5/145* (2013.01); *G01D 5/2451* (2013.01)

(58) Field of Classification Search
CPC ..... G01B 7/00–345; G01D 5/12–2525; H02K 41/03–033; H02K 7/08–088
See application file for complete search history.

(56) References Cited

U.S. PATENT DOCUMENTS 9,446,745 B2 * 9/2016 Elliott .................... B60T 8/368
2001/0038281 A1  11/2001 Nyce et al.
(Continued)

FOREIGN PATENT DOCUMENTS

JP  47-045652 A  12/1972
JP  56-35011 A   4/1981
(Continued)

OTHER PUBLICATIONS

Official Communication issued in International Patent Application No. PCT/JP20161077535, dated Dec. 13, 2016.

*Primary Examiner* — Huy Q Phan
*Assistant Examiner* — David B Frederiksen
(74) *Attorney, Agent, or Firm* — Keating & Bennett, LLP

(57) ABSTRACT

To provide a linear motion and rotation detector in which a size thereof in a linear motion direction is able to be minimized. A linear motion and rotation detector (7) includes a cylindrical magnetic scale (8) that moves linearly in an axial direction (X) and rotates in a direction around an axis, a first magnetic detection element (41) configured to detect a linear motion position, and a second magnetic detection element (42) configured to detect a rotational position. The magnetic scale (8) includes a lattice-shaped magnetized pattern (37) in which S poles and N poles are alternately arranged in the axial direction (X) and S poles and N poles are alternately magnetized in the direction around the axis on a circumferential surface thereof. The first magnetic detection element (41) and the second magnetic detection element (42) are disposed to face the magnetized pattern (37). Since a linear motion position and a rotational position are able to be detected using the first magnetic detection element (41) and the second magnetic detection element (42) which face the same magnetized pattern, it is unnecessary to arrange the linear motion scale and the rotational scale at different positions in the axial (Continued)

direction (X). Thus, an increase in size of the linear motion and rotation detector (7) in the axial direction (X) can be minimized.

11 Claims, 10 Drawing Sheets

(56) References Cited

U.S. PATENT DOCUMENTS

| | | | | |
|---|---|---|---|---|
| 2010/0052664 A1* | 3/2010 | Nishizawa | ............ | G01D 5/2451 324/207.25 |
| 2010/0060263 A1* | 3/2010 | Granig | ............ | G01D 5/145 324/202 |
| 2010/0163333 A1* | 7/2010 | Patil | ............ | B62D 15/0215 180/402 |
| 2013/0127457 A1* | 5/2013 | Musha | ............ | B82Y 25/00 324/252 |
| 2015/0369636 A1* | 12/2015 | Deak | ............ | G01D 5/2497 324/207.21 |
| 2016/0054149 A1* | 2/2016 | Alvarado | ............ | G01D 5/145 324/207.2 |
| 2016/0161574 A1* | 6/2016 | Zimmer | ............ | G01R 33/093 324/252 |

FOREIGN PATENT DOCUMENTS

| | | | |
|---|---|---|---|
| JP | 57-165702 A | | 10/1982 |
| JP | 3-191817 A | | 8/1991 |
| JP | 2002-202152 A | | 7/2002 |
| JP | 2007-143385 A | | 6/2007 |
| JP | 2007143385 A | * | 6/2007 |
| JP | 2010-60478 A | | 3/2010 |
| JP | 2010-63315 A | | 3/2010 |
| JP | 2012-118000 A | | 6/2012 |
| JP | 2015-108527 A | | 6/2015 |

* cited by examiner

[FIG. 1]
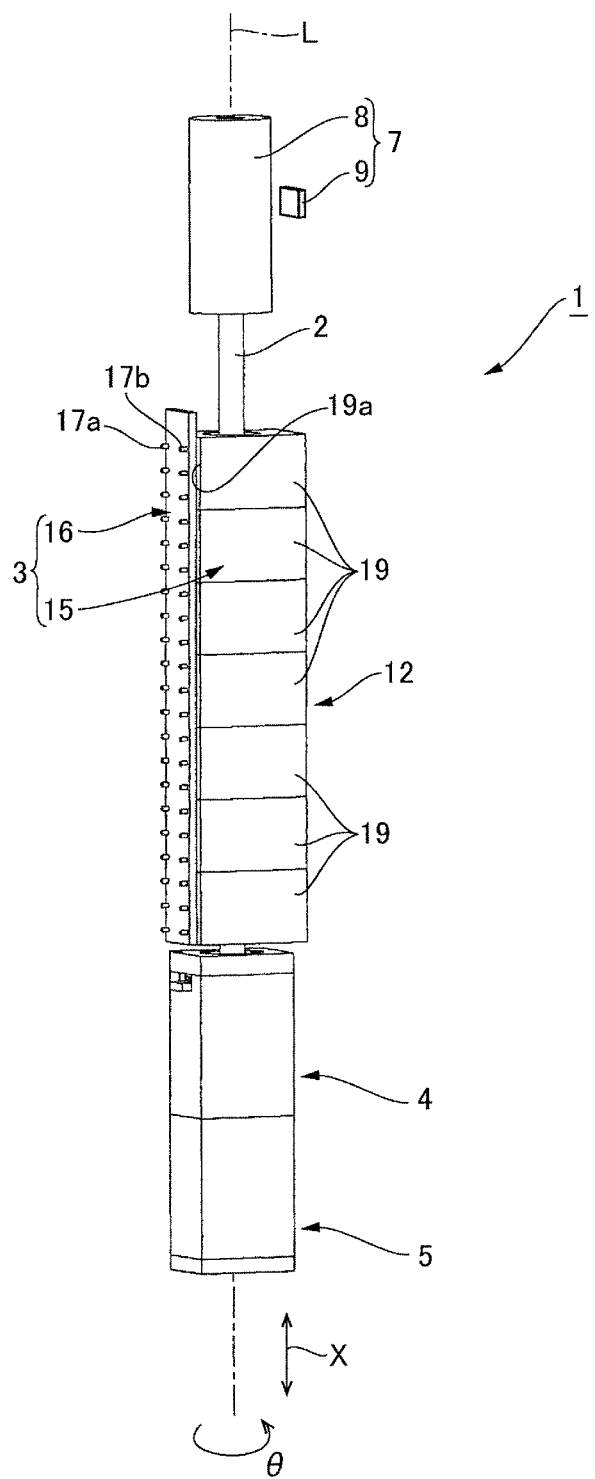

[FIG. 2]
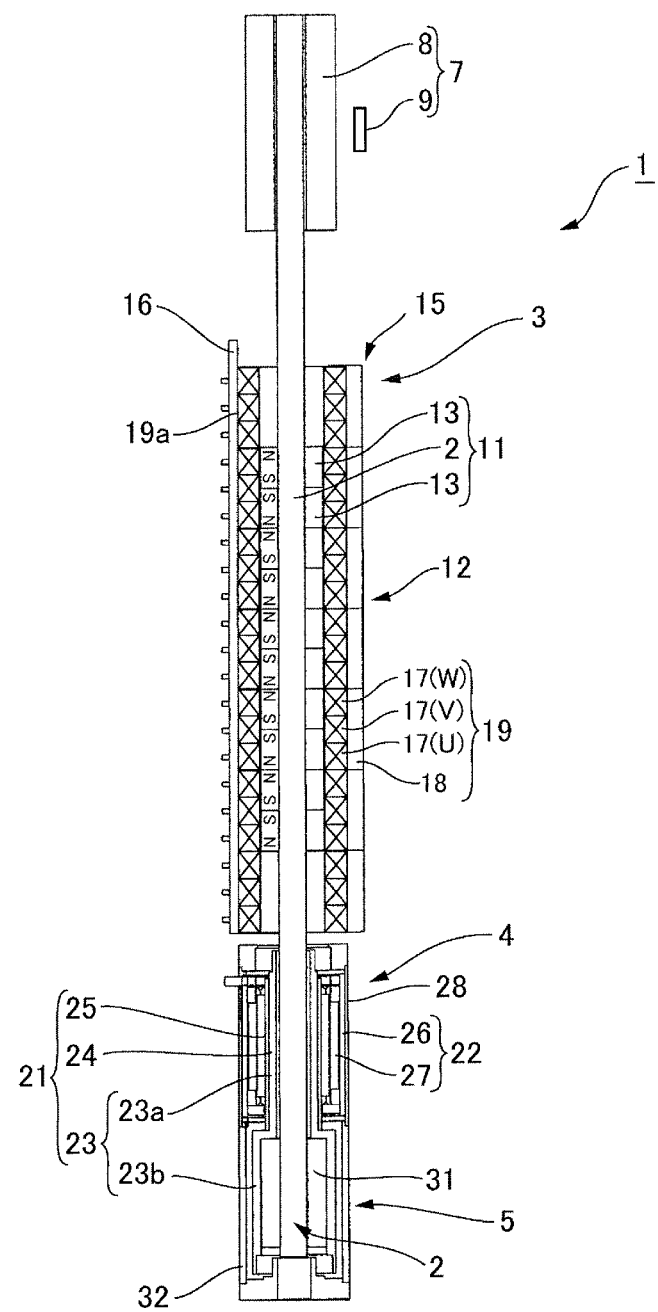

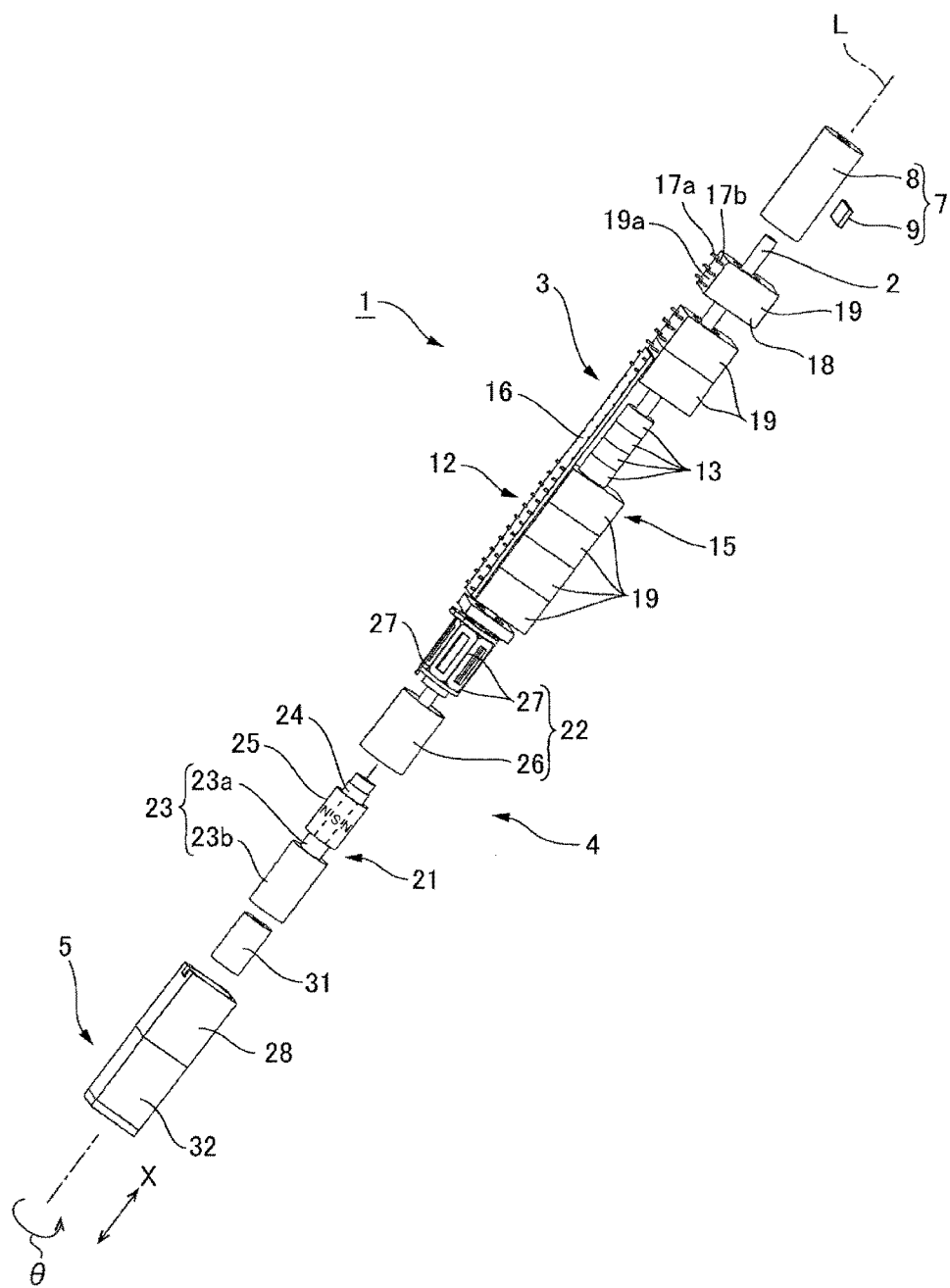
[FIG. 3]

[FIG. 4]
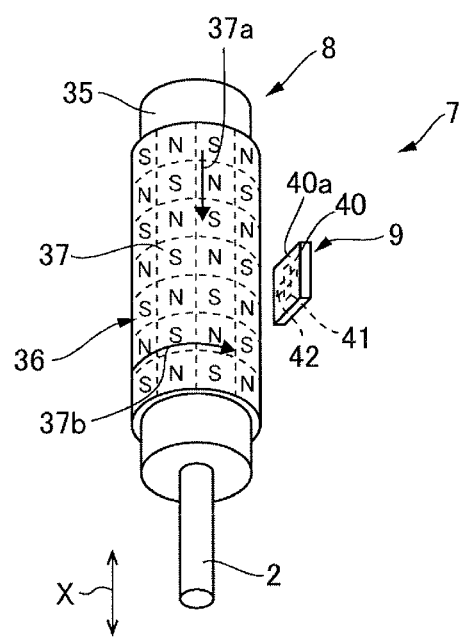

[FIG.5A]
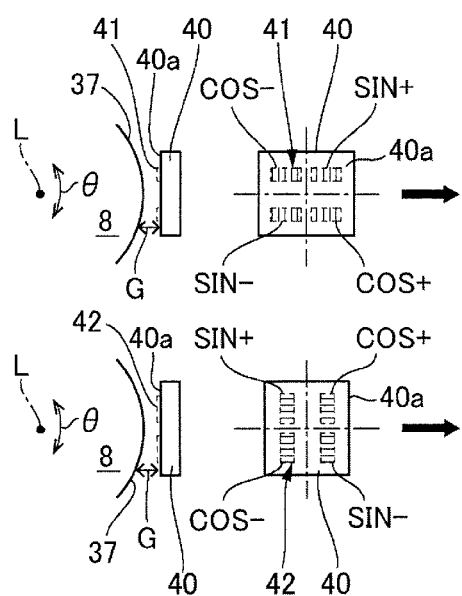

[FIG. 5B]
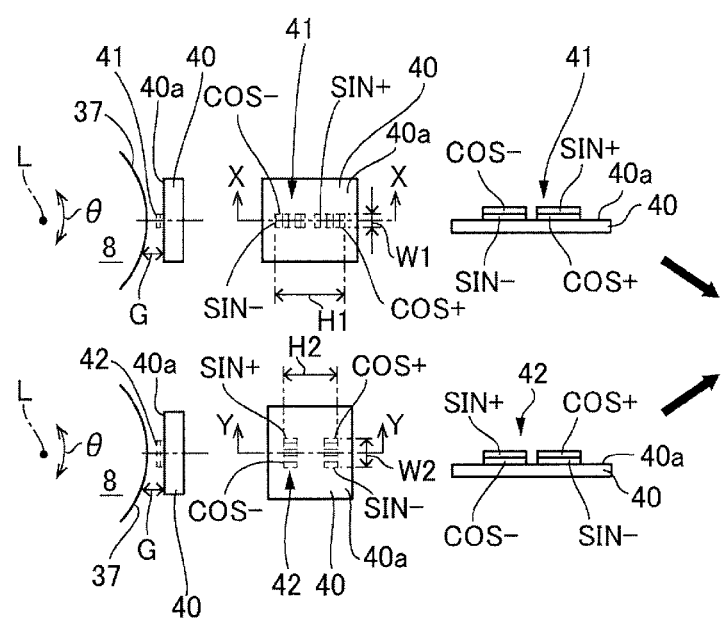

[FIG. 5C]
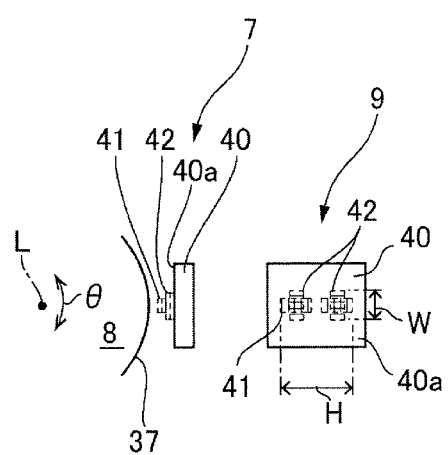

[FIG.6A]
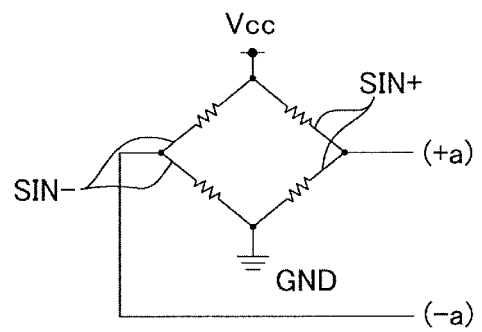
[FIG. 6B]
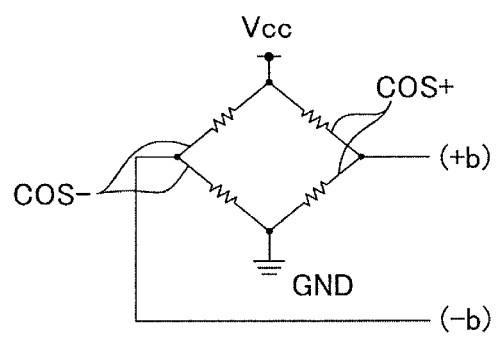

[FIG.7A]
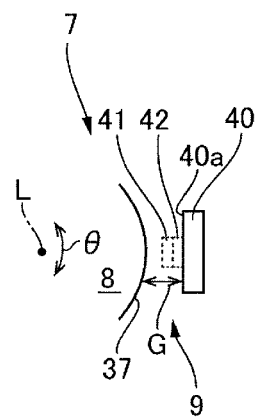
[FIG. 7B]
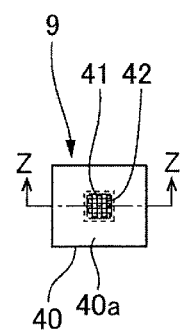

[FIG. 7C]
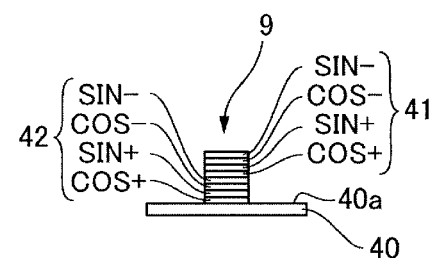
[FIG. 8]
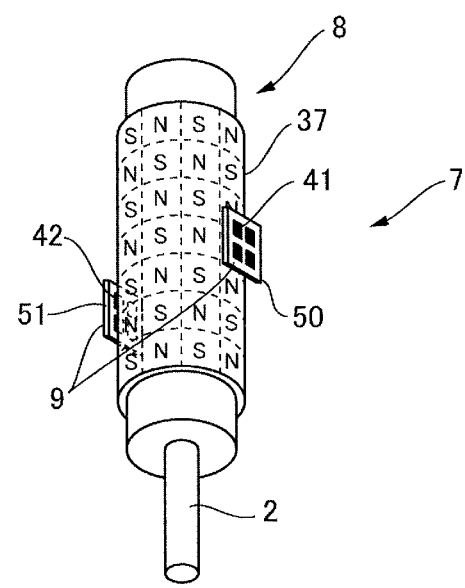

LINEAR MOTION AND ROTATION DETECTOR

BACKGROUND OF THE INVENTION

1. Field of the Invention

The present invention relates to a linear motion and rotation detector that detects a rotational position and a linear motion position of a driven object.

2. Description of the Related Art

Japanese Patent Laid-Open No. 2010-60478 discloses a linear motion and rotation drive apparatus including a motor that linearly moves or rotates an output shaft and a linear motion and rotation detector that detects a linear motion position and a rotational position of the output shaft. In Japanese Patent Laid-Open No. 2010-60478, the linear motion and rotation detector includes a cylindrical linear motion scale that includes linear motion scales provided at regular intervals in a linear motion direction and includes a disc-shaped permanent magnet (rotational) scale) magnetized with two poles in a circumferential direction. The linear motion scale and the permanent magnet are fixed coaxially with the output shaft. Furthermore, the linear motion scale and the permanent magnet are fixed at different positions of the output shaft in an axial direction. The linear motion and rotation detector includes a linear motion displacement detector that detects displacement in a linear motion direction by reading the linear motion scale and a rotation displacement detector that detects displacement in a rotational direction from a magnetic field of the permanent magnet.

A linear motion scale usually has a length corresponding to a linear motion distance of a driven object (output shaft). Therefore, as disclosed in Japanese Patent Laid-Open No. 2010-60478, when the linear motion scale and the rotational scale are disposed at different positions in the axial direction, a size of the linear motion and rotation detector in the axial direction is increased by at least a length of the rotational scale in the axial direction with respect to the linear motion distance of the driven object.

SUMMARY OF THE INVENTION

The present invention was made in view of the above-described problems and an object of the present invention is to provide a linear motion and rotation detector capable of suppressing an increase in size thereof in an axial direction.

In order to solve the above-described problems, a linear motion and rotation detector according to the present invention includes: a cylindrical magnetic scale that moves linearly in an axial direction and rotates in a direction around an axis; a first magnetic detection element configured to detect a linear motion position; and a second magnetic detection element configured to detect a rotational position, wherein the magnetic scale includes a lattice-shaped magnetized pattern in which S poles and N poles are alternately arranged in the axial direction and the S poles and the N poles are alternately magnetized in the direction around the axis on a circumferential surface thereof in the direction around the axis, and the first magnetic detection element and the second magnetic detection element are disposed to face the magnetized pattern.

According to the present invention, in the linear motion and rotation detector, the magnetic scale includes the lattice-shaped magnetized pattern in which the S poles and N poles are alternately arranged in the axial direction and the S poles and the N poles are alternately magnetized in the direction around the axis on the circumferential surface thereof in the direction around the axis. Here, the lattice-shaped magnetized pattern includes a plurality of tracks in which the S poles and the N poles are alternately arranged in the axial direction and extend in the axial direction in parallel in the circumferential direction. Furthermore, the lattice-shaped magnetized pattern includes a plurality of tracks in which the S poles and the N poles are alternately arranged in the circumferential direction and extend in the circumferential direction in parallel in the axial direction. Therefore, a linear motion position can be detected by detecting a change in a magnetic field when a plurality of columns of tracks extending in the axial direction move in the axial direction using the first magnetic detection element configured to detect the linear motion position. Furthermore, a rotational position can be detected by detecting a change in a magnetic field when the plurality of columns of tracks extending in the circumferential direction rotate in the direction around the axis using the second magnetic detection element configured to detect the rotational position. In other words, in the present invention, a linear motion position and a rotational position can be detected using the first magnetic detection element and the second magnetic detection element which face the same magnetized pattern. Thus, it is unnecessary to arrange the linear motion scale and the rotational scale at different positions in the axial direction. Furthermore, since the first magnetic detection element and the second magnetic detection element are able to be disposed to face the same magnetized pattern, the first magnetic detection element and the second magnetic detection element are able to be disposed at the same position in the axial direction. Thus, an increase in size of the linear motion and rotation detector in the axial direction can be minimized.

In the present invention, the linear motion and rotation detector can include the sensor substrate including the first magnetic detection element and the second magnetic detection element. Thus, an increase in size of the linear motion and rotation detector can be minimized as compared with a case in which the first magnetic detection element and the second magnetic detection element are included in separate sensor substrates.

In this case, it is preferable that the first magnetic detection element is a magnetoresistive element and includes an A phase first magnetoresistance pattern and a B phase first magnetoresistance pattern configured to detect a linear motion of the magnetic scale with a phase difference of 90° from each other, and the second magnetic detection element is a magnetoresistive element and includes an A phase second magnetoresistance pattern and a B phase second magnetoresistance pattern configured to detect rotation of the magnetic scale with a phase difference of 90° from each other, the A phase first magnetoresistance pattern and the B phase first magnetoresistance pattern are preferably stacked above the sensor substrate, and the A phase second magnetoresistance pattern and the B phase second magnetoresistance pattern are preferably stacked above the sensor substrate. Thus, formation areas of the first magnetic detection element and the second magnetic detection element above the sensor substrate can be reduced. Therefore, a size of the sensor substrate can be reduced and thus a size of the apparatus can be reduced.

In the present invention, in the linear motion and rotation detector, the A phase first magnetoresistance pattern, the B phase first magnetoresistance pattern, the A phase second magnetoresistance pattern, and the B phase second magnetoresistance pattern can be stacked above the sensor substrate. Thus, formation areas of the first magnetic detection element and the second magnetic detection element can be reduced as compared with a case in which the first magnetic detection element and the second magnetic detection element are formed above the sensor substrate without being stacked. Therefore, a size of the sensor substrate can be reduced. Thus, it is easy to miniaturize the apparatus.

In the present invention, preferably, in the linear motion and rotation detector, in the first magnetic detection element, a width above the sensor substrate in a direction corresponding to the direction around the axis of the magnetic scale is preferably shorter than a height above the sensor substrate in a direction corresponding to the axial direction of the magnetic scale, and in the second magnetic detection element, a width above the sensor substrate in a direction corresponding to the direction around the axis of the magnetic scale is preferably shorter than a height above the sensor substrate in a direction corresponding to the axial direction of the magnetic scale. In other words, a magnetized pattern in which the first magnetic detection element and the second magnetic detection element detect a change in a magnetic field is provided on the circumferential surface of the magnetic scale. Therefore, when the sensor substrate faces the circumferential surface of the magnetic scale in a posture in which the sensor substrate is parallel to the axis, a gap between the magnetic scale (magnetized pattern) and the sensor substrate varies in the circumferential direction of the magnetic scale. Thus, when the A phase first magnetoresistance pattern and the B phase first magnetoresistance pattern constituting the first magnetic detection element are stacked above the sensor substrate so that a width in the first magnetic detection element in a direction corresponding to the circumferential direction of the magnetic scale is shortened, an influence of a magnetic intensity portion due to a gap fluctuation between the magnetic scale and the sensor substrate on an output from the first magnetic detection element can be minimized. Furthermore, when the A phase second magnetoresistance pattern and the B phase second magnetoresistance pattern constituting the second magnetic detection element are stacked above the sensor substrate so that a width in the second magnetic detection element in a direction corresponding to the circumferential direction of the magnetic scale is shortened, an influence of a magnetic intensity portion due to a gap fluctuation between the magnetic scale and the sensor substrate on an output from the second magnetic detection element can be minimized. In addition, when widths in the first magnetic detection element and the second magnetic detection element in directions corresponding to the circumferential directions of the magnetic scales are shortened, a diameter of the magnetic scale can be reduced.

In this case, it is preferable that the center of the first magnetic detection element in the width direction and the center of the second magnetic detection element in the width direction faces the vertex of the curvature of the magnetic scale. Thus, a sinusoidal wave with less distortion can be obtained with respect to an output from the first magnetic detection element and an output from the second magnetic detection element.

In the present invention, in the linear motion and rotation detector, the A phase first magnetoresistance pattern can include a +a phase first magnetoresistance pattern and a −a phase first magnetoresistance pattern configured to detect a linear motion of the magnetic scale with a phase difference of 180°, the B phase first magnetoresistance pattern can include a +b phase first magnetoresistance pattern and a −b phase first magnetoresistance pattern configured to detect a linear motion of the magnetic scale with a phase difference of 180°, the A phase second magnetoresistance pattern can include a +a phase second magnetoresistance pattern and a −a phase second magnetoresistance pattern configured to detect a linear motion of the magnetic scale with a phase difference of 180°, the B phase second magnetoresistance pattern can include a +b phase second magnetoresistance pattern and a −b phase second magnetoresistance pattern configured to detect a linear motion of the magnetic scale with a phase difference of 180°, and the +a phase first magnetoresistance pattern, the −a phase first magnetoresistance pattern, the +b phase first magnetoresistance pattern, the +b phase first magnetoresistance pattern, the +a phase second magnetoresistance pattern, the −a phase second magnetoresistance pattern, the +b phase second magnetoresistance pattern, and the +b phase second magnetoresistance pattern can be stacked. Thus, formation areas of the first magnetic detection element and the second magnetic detection element can be reduced as compared with a case in which the first magnetic detection element and the second magnetic detection element are formed above the sensor substrate without being stacked. Therefore, a size of the sensor substrate can be reduced. Thus, it is easy to miniaturize the apparatus. Furthermore, a length of the magnetic scale in the first magnetic detection element in a direction corresponding to the circumferential direction and a length of the magnetic scale in the second magnetic detection element in a direction corresponding to the circumferential direction can be shortened as compared with a case in which the first magnetic detection element and the second magnetic detection element are formed above the sensor substrate without being stacked. Thus, an influence of a magnetic intensity portion due to a gap fluctuation between the cylindrical magnetic scale and the sensor substrate on an output from the first magnetic detection element and an output from the second magnetic detection element can be minimized.

In the present invention, the linear motion and rotation detector can include a first sensor substrate including the first magnetic detection element, wherein the first magnetic detection element is a magnetoresistive element and includes an A phase first magnetoresistance pattern and a B phase first magnetoresistance pattern configured to detect a linear motion of the magnetic scale with a phase difference of 90° from each other, and the A phase first magnetoresistance pattern and the B phase first magnetoresistance pattern can be stacked above the first sensor substrate. When the A phase first magnetoresistance pattern and the B phase first magnetoresistance pattern constituting the first magnetic detection element are stacked above the first sensor substrate, formation areas thereof can be reduced as compared with a case in which the first magnetic detection element above the first sensor substrate is formed above the first sensor substrate without stacking the magnetoresistance patterns. Thus, since a size of the first sensor substrate can be reduced, it is easy to miniaturize the linear motion and rotation detector.

In the present invention, in the linear motion and rotation detector, in the first magnetic detection element, a width above the first sensor substrate in a direction corresponding to the direction around the axis of the magnetic scale is preferably shorter than a height above the first sensor substrate in a direction corresponding to the axial direction of the magnetic scale. In other words, a magnetized pattern in which the first magnetic detection element detects a change in a magnetic field is provided on the circumferential surface of the magnetic scale. Therefore, when the first sensor substrate faces the circumferential surface of the magnetic scale in a posture in which the first sensor substrate is parallel to the axis, a gap between the magnetic scale (magnetized pattern) and the first sensor substrate varies in the circumferential direction. Thus, when the A phase first magnetoresistance pattern and the B phase first magnetoresistance pattern constituting the first magnetic detection element are stacked above the first sensor substrate so that a width in the first magnetic detection element in a direction corresponding to the circumferential direction of the magnetic scale is shortened, an influence of a magnetic intensity portion due to a gap fluctuation between the magnetic scale and the first sensor substrate on an output from the first magnetic detection element can be minimized.

In this case, it is preferable that a center of the first magnetic detection element above the first sensor substrate in a width direction thereof preferably faces a vertex of curvature of the magnetic scale. Thus, a sinusoidal wave with little distortion can be obtained with respect to an output from the first magnetic detection element.

In the present invention, the linear motion and rotation detector can include a second sensor substrate including the second magnetic detection element, wherein the second magnetic detection element is a magnetoresistive element and includes an A phase second magnetoresistance pattern and a B phase second magnetoresistance pattern configured to detect rotation of the magnetic scale with a phase difference of 90° from each other, and the A phase second magnetoresistance pattern and the B phase second magnetoresistance pattern can be stacked above the second sensor substrate. When the A phase second magnetoresistance pattern and the B phase second magnetoresistance pattern constituting the second magnetic detection element are stacked above the second sensor substrate, a size thereof can be reduced as compared with a case in which the second magnetic detection element above the second sensor substrate is formed above the second sensor substrate without stacking the magnetoresistance patterns. Thus, since a size of the second sensor substrate can be reduced, it is easy to miniaturize the linear motion and rotation detector.

In the present invention, in the linear motion and rotation detector, in the second magnetic detection element, a width above the second sensor substrate in a direction corresponding to the direction around the axis of the magnetic scale is preferably shorter than a height above the second sensor substrate in a direction corresponding to the axial direction of the magnetic scale. In other words, a magnetized pattern in which the second magnetic detection element detects a change in a magnetic field is provided on the circumferential surface of the magnetic scale. Therefore, when the second sensor substrate faces the circumferential surface of the magnetic scale in a posture in which the second sensor substrate is parallel to the axis, a gap between the magnetic scale (magnetized pattern) and the second sensor substrate varies in the circumferential direction of the magnetic scale. Thus, when the A phase second magnetoresistance pattern and the B phase second magnetoresistance pattern constituting the second magnetic detection element are stacked above the second sensor substrate so that a width in the second magnetic detection element in a direction corresponding to the circumferential direction of the magnetic scale is shortened, an influence of a magnetic intensity portion due to a gap fluctuation between the magnetic scale and the second sensor substrate on an output from the second magnetic detection element can be minimized.

In this case, in the linear motion and rotation detector, a center of the second magnetic detection element above the second sensor substrate in a width direction thereof preferably faces a vertex of curvature of the magnetic scale. Thus, a sinusoidal wave with little distortion can be obtained with respect to an output from the second magnetic detection element.

According to a linear motion and rotation detector of the present invention, a linear motion position and a rotational position can be detected using one magnetic scale having a lattice-shaped magnetized pattern in which S poles and N poles are alternately arranged in an axial direction and the S poles and the N poles are alternately magnetized in a direction around an axis on a circumferential surface thereof. Thus, it is unnecessary to arrange a linear motion scale and a rotational scale in an axial direction. Furthermore, since a first magnetic detection element and a second magnetic detection element can be disposed to face a magnetized pattern provided in one magnetic scale, the first magnetic detection element and the second magnetic detection element can be disposed at the same position in the axial direction. Therefore, an increase in size of the linear motion and rotation detector in the axial direction can be minimized.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is an exterior perspective view of a linear motion and rotation drive apparatus including a linear motion and rotation detector according to the present invention.

FIG. 2 is a cross-sectional view of the linear motion and rotation drive apparatus in FIG. 1 taken along a surface thereof cut to include an axis thereof.

FIG. 3 is an exploded perspective view of the linear motion and rotation drive apparatus in FIG. 1.

FIG. 4 is a diagram for describing a linear motion and rotation detector.

FIG. 5A, FIG. 5B and FIG. 5C is a diagram for describing a magnetic sensor of a linear motion and rotation detector.

FIG. 6A and FIG. 6B is a diagram for describing a circuit constituted of magnetoresistive elements of the magnetic sensor.

FIG. 7A, FIG. 7B and FIG. 7C is a diagram for describing a magnetic sensor according to a modification.

FIG. 8 is a diagram for describing a linear motion and rotation detector according to a modification.

DETAILED DESCRIPTION OF THE PREFERRED EMBODIMENTS

Embodiments of the present invention will be described with reference to the drawings.

FIG. 1 is an exterior perspective view of a linear motion and rotation drive apparatus including a linear motion and rotation detector according to the present invention. FIG. 2 is a cross-sectional view of the linear motion and rotation drive apparatus in FIG. 1 taken along a surface thereof cut to include an axis thereof. FIG. 3 is an exploded perspective view of the linear motion and rotation drive apparatus in FIG. 1. As illustrated in FIG. 1, a linear motion and rotation drive apparatus 1 includes an output shaft 2, a linear motor 3 that moves the output shaft 2 along an axis L, a rotational motor 4 that rotates the output shaft in a direction θ around the axis, and a ball spline bearing (bearing) 5. The ball spline bearing 5 supports the output shaft 2 to be movable in an axial direction X and transfers a driving force of the rotational motor 4 to the output shaft 2.

The linear motion and rotation drive apparatus 1 also includes a linear motion and rotation detector 7 that detects a linear motion position and a rotational position of the output shaft 2. The linear motion and rotation detector 7 includes a cylindrical magnetic scale 8 fixed coaxially with the output shaft 2 and a magnetic sensor 9 that faces the magnetic scale 8 from a direction which is orthogonal to the axis L.

The magnetic scale 8, the linear motor 3, the rotational motor 4, and the ball spline bearing 5 of the linear motion and rotation detector 7 are arranged coaxially in this order from one side to the other side in the axial direction X. Note that, in the following description, it is assumed that an axial direction is X and a direction around the axis is θ.

As illustrated in FIG. 2, the linear motor 3 includes a mover 11 and a stator 12. The mover 11 includes the output shaft 2 and a plurality of permanent magnets 13 fixed to an outer circumferential surface of the output shaft 2. Each of the permanent magnets 13 is annular, and includes an N pole and an S pole magnetized in the axial direction X. In the plurality of permanent magnets 13, neighboring permanent magnets 13 face each other to face the same poles. In the embodiment, ten permanent magnets 13 are fixed to the output shaft 2.

The stator 12 is located on an outer circumference side of the mover 11. As illustrated in FIGS. 1 and 2, the stator 12 includes a tubular coil arrangement body 15 including a plurality of coils 17 which are arranged coaxially and a wiring board 16 fixed to the coil arrangement body 15.

As illustrated in FIGS. 2 and 3, the coil arrangement body 15 includes a plurality of tubular coil units 19 in which three neighboring coils 17 in the axial direction X are integrally covered with a resin 18. The coil units 19 are coupled coaxially in the axial direction X, thereby constituting the coil arrangement body 15. In the embodiment, the coil arrangement body 15 includes seven coil units 19. Therefore, the coil arrangement body 15 includes 21 coils 17.

A contour shape of each of the coil units 19 viewed from the axial direction X is rectangular. Furthermore, each of the coil units 19 has a flat shape in which a height dimension in the axial direction X is shorter than a length of each side of the rectangular shape forming the contour shape. A length dimension of each of the coil units 19 in the axial direction X is about twice a length dimension of each of the permanent magnets 13 fixed to the mover 11 in the axial direction X.

Each of the coil units 19 has four lateral surfaces in the direction θ around the axis. As illustrated in FIG. 1, one of the four lateral surfaces is a substrate fixing surface 19a. As illustrated in FIG. 3, a start end 17a and an end end 17b of each coil in the coil unit 19 are exposed (protrude) from the substrate fixing surface 19a to the outside. The coil units 19 are coupled in a posture in which the substrate fixing surfaces 19a are oriented in the same direction. The wiring board 16 is fixed to a flat surface (substrate fixing surface of the coil arrangement body 15) formed by arranging the substrate fixing surfaces 19a of the coil units 19 in the axial direction X. The start ends 17a and the end ends 17b of the coils 17 of the coil units 19 are connected to the wiring board 16.

Here, the linear motor 3 is a 3-phase motor and three coils 17 of each of the coil units 19 function as a U phase coil 17 (U), a V phase coil 17 (V), and a W phase coil 17 (W) when the linear motor 3 is driven. In the linear motor 3, the mover 11 is moved in the axial direction X while a coil 17 through which electricity is applied is moved in the axial direction X.

The rotational motor 4 includes a mover 21 and a stator 22. The mover 21 includes a hollow nut shaft 23 through which the output shaft 2 passes. As illustrated in FIG. 3, the nut shaft 23 includes a small diameter cylindrical part 23a and a large diameter cylindrical part 23b having a larger diameter than the small diameter cylindrical part 23a. The large diameter cylindrical part 23b is continuously provided on the ball spline bearing 5 side of the small diameter cylindrical part 23a. Furthermore, the mover 21 includes a tubular yoke 24 fixed to an outer circumferential surface of the small diameter cylindrical part 23a in the nut shaft 23 and a tubular permanent magnet 25 fixed to an outer circumferential surface of the yoke 24. The permanent magnet 25 is tubular, and a plurality of N poles and S poles are magnetized alternately in the direction θ around the axis (in a circumferential direction).

The stator 22 is located on an outer circumference side of the permanent magnet 25. The stator 22 includes a tubular yoke 26 that surrounds the permanent magnet 25 from an outer circumference side thereof and a plurality of coils 27 fixed to an inner circumferential surface of the yoke 26. Each of the coils 27 is fixed to the yoke 26 in a posture in which a hollow portion thereof is oriented in a radial direction which is orthogonal to the axis L. The plurality of coils 27 are arranged in the direction θ around the axis. In the embodiment, the stator 22 includes six coils 27. The yoke 26 is held by a case 28 from an outer circumference side thereof. A contour shape of the case 28 viewed from the axial direction X is square.

The nut shaft 23 rotates in the direction θ around the axis when electricity is applied to the coils 27. Here, a ball nut 31 constituting the ball spline bearing 5 is disposed on an inner circumference side of the large diameter cylindrical part 23b in the nut shaft 23. Note that balls constituting the ball spline bearing 5 and a spline provided on the output shaft 2 are omitted in FIG. 2. The rotation of the nut shaft 23 is transferred to the output shaft 2 via the ball nut 31. Therefore, the output shaft 2 rotates when the rotational motor 4 is driven. The large diameter cylindrical part 23b of the nut shaft 23 is covered with a bearing case 32. A contour shape of the bearing case 32 viewed from the axial direction X is square. According to the rotational motor 4 of the embodiment, since only the output shaft 2 can be moved in the axial direction X even if the mover 21 is not moved in the axial direction X, a size of the rotational motor 4 can be reduced.

FIG. 4 is a diagram for describing the linear motion and rotation detector 7. As illustrated in FIG. 4, the magnetic scale 8 is cylindrical. As illustrated in FIGS. 1 to 3, the magnetic scale 8 is fixed coaxially with the output shaft 2 while the output shaft 2 passes through a central hole thereof. The magnetic scale 8 moves linearly in the axial direction X integrally with the output shaft 2 and rotates in the direction θ around the axis.

The magnetic scale 8 includes a tubular member 35 serving as a fixed part to the output shaft 2 and an annular permanent magnet 36 fixed to an outer circumference side of the tubular member 35. In the permanent magnet 36, S poles and N poles are alternately arranged on a circumferential surface thereof in the direction θ around the axis in the axial direction X and a lattice-shaped magnetized pattern 37 in which S poles and N poles are magnetized alternately in the direction θ around the axis is included. Here, the lattice-shaped magnetized pattern 37 includes a plurality of axial tracks 37a in which S poles and N poles are alternately arranged in the axial direction X and which extend in the direction θ around the axis in parallel in the axial direction X. Furthermore, the lattice-shaped magnetized pattern 37 includes a plurality of circumferential tracks 37b in which S poles and N poles are arranged alternately in the direction θ around the axis and which extend in the direction θ around the axis in parallel in the axial direction X.

The magnetic sensor 9 includes a sensor substrate 40 that faces the magnetic scale 8 from a direction which is orthogonal to the axis L in a posture in which the magnetic sensor 9 is parallel to the axis L. Furthermore, the magnetic sensor 9 includes a first magnetoresistive element (first magnetic detection element) 41 for detecting a linear motion position and a second magnetoresistive element (second magnetic detection element) 42 for detecting a rotational position formed above a substrate surface 40a facing the magnetic scale 8 in the sensor substrate 40.

FIG. 5A to 5C is a diagram for describing the magnetic sensor 9. A diagram on the upper left side of FIG. 5A is a diagram for describing a positional relationship between the magnetic scale 8 viewed from the axial direction X and the first magnetoresistive element 41 and the sensor substrate 40 when a first magnetoresistive element 41 is formed above the substrate surface 40a as a single layer and a diagram on the upper right side of FIG. 5A is a diagram for describing disposition of a magnetoresistance pattern when the first magnetoresistive element 41 is formed above the substrate surface 40a as a single layer. A diagram on the lower left side of FIG. 5A is a diagram for describing a positional relationship between the magnetic scale 8 viewed from the axial direction X and a second magnetoresistive element 42 and the sensor substrate 40 when the second magnetoresistive element 42 is formed above the substrate surface 40a as a single layer and a diagram on the lower right side of FIG. 5A is a diagram for describing disposition of a magnetoresistance pattern when the second magnetoresistive element 42 is formed above the substrate surface 40a as a single layer.

A diagram on the upper left side of FIG. 5B is a diagram for describing a positional relationship between the magnetic scale 8 viewed from the axial direction X and the first magnetoresistive element 41 and the sensor substrate 40 when the first magnetoresistive element 41 is formed above the substrate surface 40a in two layers, a diagram on the upper center of FIG. 5B is a diagram for describing disposition of a magnetoresistance pattern when the first magnetoresistive element 41 is formed above the substrate surface 40a in two layers, and a diagram on the upper right side of FIG. 5B is an explanatory diagram schematically illustrating a cross section of the first magnetoresistive element 41 taken along line X-X in the diagram on the upper center of FIG. 5B. A diagram on the lower left side of FIG. 5B is a diagram for describing a positional relationship between the magnetic scale 8 viewed from the axial direction X and the second magnetoresistive element 42 and the sensor substrate 40 when the second magnetoresistive element 42 is formed above the substrate surface 40a in two layers, a diagram on the lower center of FIG. 5B is a diagram for describing disposition of a magnetoresistance pattern when the second magnetoresistive element 42 is formed above the substrate surface 40a in two layers, and a diagram on the lower right side of FIG. 5B is a diagram schematically illustrating a cross section of the second magnetoresistive element 42 taken along line Y-Y in the diagram on the lower center of FIG. 5B. A diagram on the left side of FIG. 5C is a diagram for describing a positional relationship between the magnetic scale 8 viewed from the axial direction X and the first magnetoresistive element 41, the second magnetoresistive element 42, and the sensor substrate 40 when the first magnetoresistive element 41 and the second magnetoresistive element 42 are stacked and the diagram on the right side of FIG. 5C is a diagram for describing disposition of the first magnetoresistive element 41 and the second magnetoresistive element 42 in the substrate surface 40a. FIG. 6A to 6C is a diagram for describing a circuit constituted of the magnetoresistive elements 41 and 42.

A magnetism detection direction of the first magnetoresistive element 41 is oriented in the axial direction X. Therefore, the magnetized pattern 37 of the magnetic scale 8 is set to include a plurality of columns of axial tracks 37a in which S poles and N poles are alternately arranged and which extend in the axial direction X in the direction θ around the axis and the first magnetoresistive element 41 detects a change in magnetic field when the magnetic scale 8 is moved. Here, the first magnetoresistive element 41 detects a rotating magnetic field generated at a boundary portion between two axial tracks 37a adjacent to each other in the direction θ around the axis (portion in which an N pole and an S pole are adjacent to each other) among the plurality of axial tracks 37a. Furthermore, the first magnetoresistive element 41 detects a rotating magnetic field using a saturation sensitivity region of a magnetoresistive element. In other words, the first magnetoresistive element 41 flows a current through a magnetoresistance pattern which will be described below and applies a magnetic field strength which causes the magnetoresistance pattern to have a saturated resistance value, and detects a rotating magnetic field in which a direction in an in-plane direction changes at a boundary portion.

The first magnetoresistive element 41 includes an A phase first magnetoresistance pattern SIN and a B phase first magnetoresistance pattern COS configured to detect a linear motion of the magnetic scale 8 with a phase difference of 90° from each other. In other words, the sensor substrate 40 includes the A phase first magnetoresistance pattern SIN and the B phase first magnetoresistance pattern COS at positions in which the same wavelength obtained from the magnetic scale 8 can be detected with a phase difference of 90°.

Also, the A phase first magnetoresistance pattern SIN includes a +a phase first magnetoresistance pattern SIN+ and a −a phase first magnetoresistance pattern SIN− configured to detect a linear motion of the magnetic scale 8 with a phase difference of 180°. Similarly, the B phase first magnetoresistance pattern COS includes a +b phase first magnetoresistance pattern COS+ and a −b phase first magnetoresistance pattern COS− configured to detect a linear motion of the magnetic scale 8 with a phase difference of 180°. In other words, a +a phase first magnetoresistance pattern SIN+ and a +b phase first magnetoresistance pattern COS+ are formed at positions above the sensor substrate 40 in which the same wavelength obtained from the magnetic scale 8 can be detected with a phase difference of 90°. Furthermore, a −a phase first magnetoresistance pattern SIN− and a −b phase first magnetoresistance pattern COS− are formed at positions above the sensor substrate 40 in which the same wavelength obtained from the magnetic scale 8 can be detected with a phase difference of 90°.

As illustrated in the diagram on the upper right side of FIG. 5A, the +a phase first magnetoresistance pattern SIN+, the +b phase first magnetoresistance pattern COS+, the −a phase first magnetoresistance pattern SIN−, and the −b phase first magnetoresistance pattern COS− can be formed above the substrate surface 40a in a single layer so that the first magnetoresistance patterns SIN+, SIN−, COS+, and COS− do not overlap.

On the other hand, in the embodiment, two layers of the A phase first magnetoresistance pattern SIN (SIN+ or SIN−) and the B phase first magnetoresistance pattern COS (COS+ or COS−) overlap above the sensor substrate 40.

To be more specific, as illustrated in the diagrams on the upper center and right side in FIG. 5B, a +b phase first magnetoresistance pattern COS+ is formed above the substrate surface 40a of the sensor substrate 40 and a +a phase first magnetoresistance pattern SIN+ is stacked thereabove. Furthermore, a −a phase first magnetoresistance pattern SIN− is formed above the substrate surface 40a of the sensor substrate 40 and a −b phase first magnetoresistance pattern COS− is stacked thereabove. Note that the +a phase first magnetoresistance pattern SIN+ and the +b phase first magnetoresistance pattern COS+ may be stacked as opposed to the above. Furthermore, the −a phase first magnetoresistance pattern SIN− and the −b phase first magnetoresistance pattern COS− may be stacked as opposed to the above.

When the A phase first magnetoresistance pattern SIN and the B phase first magnetoresistance pattern COS constituting the first magnetoresistive element 41 are stacked above the sensor substrate 40, a degree of freedom of disposition of the A phase first magnetoresistance pattern SIN and the B phase first magnetoresistance pattern COS above the sensor substrate 40 is increased. Therefore, a size of the first magnetoresistive element 41 can be reduced as compared with a case in which the A phase first magnetoresistance pattern SIN (SIN+ or SIN−) and the B phase first magnetoresistance pattern COS (COS+ or COS−) are formed above the sensor substrate 40 without being stacked.

In the embodiment, the A phase first magnetoresistance pattern SIN and the B phase first magnetoresistance pattern COS constituting the first magnetoresistive element 41 are stacked above the sensor substrate 40 so that a width W1 of the first magnetoresistive element 41 in a direction corresponding to the direction θ around the axis of the magnetic scale 8 is set to be shorter than a height H1 of the first magnetoresistive element 41 in a direction corresponding to the axial direction X of the magnetic scale 8 (refer to the upper side in FIG. 5B). Furthermore, in the embodiment, a center of the first magnetoresistive element 41 in a width direction thereof is present at a position in which the first magnetoresistive element 41 faces a vertex of curvature of the magnetized pattern 37 provided on a circumferential surface of the cylindrical magnetic scale 8.

Here, the magnetized pattern 37 in which the first magnetoresistive element 41 detects a change in magnetic field is provided on the circumferential surface of the cylindrical magnetic scale 8. Thus, a gap G between a first magnetoresistance pattern and the sensor substrate 40 varies in the direction θ around the axis (circumferential direction) when the sensor substrate 40 is caused to face the circumferential surface of the magnetic scale 8 in a posture in which the sensor substrate 40 is parallel to the axis L. Therefore, the width W1 of the first magnetoresistive element 41 in a direction corresponding to the direction θ around the axis of the magnetic scale 8 is shortened so that it is possible to minimize an influence of a magnetic intensity portion due to a gap fluctuation caused by curvature between the magnetic scale 8 and the sensor substrate 40 on an output from the first magnetoresistive element 41.

Note that the sensor substrate 40 is made of glass or silicon. Each magnetoresistance pattern SIN− or COS+ of a first layer provided on the substrate surface 40a is formed by stacking a magnetic film such as a ferromagnetic material NiFe on the substrate surface 40a using a semiconductor process. Furthermore, each magnetoresistance pattern COS− or SIN+ of a second layer overlapping each magnetoresistance pattern SIN− or COS+ of the first layer is formed by forming an inorganic insulating layer such as SiO$_2$ above each magnetoresistance pattern of the first layer and stacking a magnetic film such as a ferromagnetic material NiFe above the inorganic insulating layer.

Here, FIG. 6A to 6C is a circuit diagram constituted by each magnetoresistance pattern SIN+, SIN−, COS+, or COS− of the first magnetoresistive element 41. As illustrated in FIG. 6A, a +a phase first magnetoresistance pattern SIN+ and a −a phase first magnetoresistance pattern SIN− constitute a bridge circuit and one ends of both of the +a phase first magnetoresistance pattern SIN+ and the −a phase first magnetoresistance pattern SIN− are connected to a power terminal (Vcc) and the other ends thereof are connected to a ground terminal (GND). Furthermore, a terminal +a from which a +a phase is output is provided at a central point position of the +a phase first magnetoresistance pattern SIN+ and a terminal −a from which a −a phase is output is provided at a central point position of the −a phase first magnetoresistance pattern SIN−. Therefore, a sinusoidal differential output with little distortion can be obtained when an output from the terminal +a or the terminal −a is input to a subtracter.

Similarly, as illustrated in FIG. 6B, a +b phase magnetoresistance pattern COS+ and a −b phase magnetoresistance pattern COS− constitutes a bridge circuit and one ends of both of the +b phase magnetoresistance pattern COS+ and the −b phase magnetoresistance pattern COS− are connected to a power terminal (Vcc) and the other ends of both thereof are connected to a ground terminal (GND). A terminal +b from which a +b phase is output is provided at a central point position of the +b phase magnetoresistance pattern COS+ and a terminal −b from which a −b phase is output is provided at a central point position of the −b phase magnetoresistance pattern COS−. Therefore, a sinusoidal differential output with little distortion can be obtained when an output from the terminal +b or the terminal −b is input to the subtracter.

A magnetism detection direction of the second magnetoresistive element 42 is oriented in the direction θ around the axis (circumferential direction). Thus, it is assumed that the magnetized pattern 37 of the magnetic scale 8 includes a plurality of columns of circumferential tracks 37b in which an S pole and an N pole are alternately arranged in the direction θ around the axis and which extend in the direction θ around the axis in the axial direction X in the second magnetoresistive element 42, and the second magnetoresistive element 42 detects a change in magnetic field when the magnetic scale 8 rotates. Furthermore, the second magnetoresistive element 42 detects a rotating magnetic field generated at a boundary portion between two circumferential tracks 37b adjacent to each other in the axial direction X (portion in which an N pole and an S pole are adjacent to each other) among the plurality of circumferential tracks 37b. Furthermore, the second magnetoresistive element 42 detects a rotating magnetic field using a saturation sensitivity region of a magnetoresistive element. In other words, second magnetoresistive element 42 flows a current through a magnetoresistance pattern which will be described below and applies a magnetic field strength which causes the magnetoresistance pattern to have a saturated resistance value, and detects a rotating magnetic field in which a direction in an in-plane direction changes at a boundary portion.

The second magnetoresistive element 42 includes an A phase second magnetoresistance pattern SIN and a B phase second magnetoresistance pattern COS which detect rotation of the magnetic scale 8 with a phase difference of 90° from each other. In other words, the sensor substrate 40 includes the A phase second magnetoresistance pattern SIN and the B phase second magnetoresistance pattern COS at positions in which the same wavelength obtained from the magnetic scale 8 can be detected with a phase difference of 90°. Also, the A phase second magnetoresistance pattern SIN includes a +a phase second magnetoresistance pattern SIN+ and a −a phase second magnetoresistance pattern SIN− which detect rotation of the magnetic scale 8 with a phase difference of 180°. Similarly, the B phase second magnetoresistance pattern COS includes a +b phase second magnetoresistance pattern COS+ and a −b phase second magnetoresistance pattern COS− which detect rotation of the magnetic scale 8 with a phase difference of 180°. In other words, a +a phase second magnetoresistance pattern SIN+ and a +b phase second magnetoresistance pattern COS+ are formed at positions above the sensor substrate 40 in which the same wavelength obtained from the magnetic scale 8 can be detected with a phase difference of 90°. Furthermore, a −a phase second magnetoresistance pattern SIN− and a −b phase second magnetoresistance pattern COS− are formed at positions above the sensor substrate 40 in which the same wavelength obtained from the magnetic scale 8 can be detected with a phase difference of 90°.

As illustrated in the diagram on the lower right side in FIG. 5A, the +a phase second magnetoresistance pattern SIN+, the +b phase second magnetoresistance pattern COS+, the −a phase second magnetoresistance pattern SIN−, and the −b phase second magnetoresistance pattern COS− can be formed above the substrate surface 40a in a single layer so that the second magnetoresistance patterns SIN+, SIN−, COS+, and COS− do not overlap. Note that a disposition relationship between magnetoresistance patterns in a case in which the +a phase second magnetoresistance pattern SIN+, the +b phase second magnetoresistance pattern COS+, the −a phase second magnetoresistance pattern SIN−, and the −b phase second magnetoresistance pattern COS− are formed on the substrate surface 40a in a single layer is the same as that in a case in which, when the +a phase first magnetoresistance pattern SIN+, the +b phase first magnetoresistance pattern COS+, the −a phase first magnetoresistance pattern SIN−, and the −b phase first magnetoresistance pattern COS− are formed on the substrate surface 40a in a single layer, each magnetoresistance pattern (refer to the diagram on the upper right side in FIG. 5A) is rotated by 90° in an in-plane direction.

On the other hand, in the embodiment, two layers of the A phase second magnetoresistance pattern SIN (SIN+ or SIN−) and the B phase second magnetoresistance pattern COS (COS+ or COS−) overlap above the sensor substrate 40.

To be more specific, as illustrated in the diagrams on the lower center and right side in FIG. 5B, a −a phase second magnetoresistance pattern SIN− is formed above the substrate surface 40a of the sensor substrate 40 and a +b phase second magnetoresistance pattern COS+ is stacked thereabove. Furthermore, a −b phase second magnetoresistance pattern COS− is formed above the substrate surface 40a of the sensor substrate 40 and a +a phase second magnetoresistance pattern SIN+ is stacked thereabove. Note that the −a phase second magnetoresistance pattern SIN− and the +b phase second magnetoresistance pattern COS+ may be stacked as opposed to the above. Furthermore, the +a phase second magnetoresistance pattern SIN+ and the −b phase second magnetoresistance pattern COS− may be stacked as opposed to the above.

When the A phase second magnetoresistance pattern SIN and the B phase second magnetoresistance pattern COS constituting the second magnetoresistive element 42 are stacked above the sensor substrate 40, a degree of freedom of disposition of the A phase second magnetoresistance pattern SIN and the B phase second magnetoresistance pattern COS above the sensor substrate 40 is increased. Therefore, a size of the second magnetoresistive element 42 can be reduced as compared with a case in which the A phase second magnetoresistance pattern SIN (SIN+ or SIN−) and the B phase second magnetoresistance pattern COS (COS+ or COS−) are formed above the sensor substrate 40 without being stacked. Thus, since the sensor substrate 40 can be miniaturized, a size of the linear motion and rotation detector 7 can be reduced.

In the embodiment, the A phase second magnetoresistance pattern SIN and the B phase second magnetoresistance pattern COS constituting the second magnetoresistive element 42 are stacked above the sensor substrate 40 so that a width W2 of the second magnetoresistive element 42 in a direction corresponding to the direction θ around the axis of the magnetic scale 8 is set to be shorter than a height H2 of the second magnetoresistive element 42 in a direction corresponding to the axial direction X of the magnetic scale 8 (refer to the lower side in FIG. 5B). Furthermore, in the embodiment, a center of the second magnetoresistive element 42 in a width direction is present at a position in which the second magnetoresistive element 42 faces a vertex of curvature of the magnetized pattern 37 provided on the circumferential surface of the cylindrical magnetic scale 8.

Here, the magnetized pattern 37 in which the second magnetoresistive element 42 detects a change in magnetic field is provided on the circumferential surface of the cylindrical magnetic scale 8. Thus, when the sensor substrate 40 is caused to face the circumferential surface of the magnetic scale 8 in a posture in which the sensor substrate 40 is parallel to the axis L, a gap G between a second magnetoresistance pattern and the sensor substrate 40 varies in the direction θ around the axis (circumferential direction). Therefore, the width W2 of the second magnetoresistive element 42 in a direction corresponding to the direction θ around the axis of the magnetic scale 8 is shortened so that it is possible to minimize an influence of a magnetic intensity portion due to a gap fluctuation caused by curvature between the magnetic scale 8 and the sensor substrate 40 on an output from the second magnetoresistive element 42.

Note that, also with respect to the second magnetoresistive element 42, like in the first magnetoresistive element 41, each magnetoresistance pattern SIN− or COS− of a first layer provided on the substrate surface 40a is formed by stacking a magnetic film such as a ferromagnetic material NiFe on the substrate surface 40a using a semiconductor process. Furthermore, each magnetoresistance pattern COS+ or SIN+ of a second layer overlapping each magnetoresistance pattern SIN− or COS− of the first layer is formed by forming an inorganic insulating layer such as SiO2 above each magnetoresistance pattern of the first layer and stacking a magnetic film such as a ferromagnetic material NiFe above the inorganic insulating layer.

Also, the second magnetoresistive element 42 includes a circuit configuration that is the same as that of the first magnetoresistive element 41. Since the circuit configuration of the second magnetoresistive element 42 is the same as that illustrated in FIG. 6A to 6C, detailed description thereof will be omitted.

Here, in the embodiment, as illustrated in FIG. 5C, the first magnetoresistive element 41 and the second magnetoresistive element 42 are further stacked above the sensor substrate 40. In other words, two layers of the A phase first magnetoresistance pattern SIN and the B phase first magnetoresistance pattern COS constituting the first magnetoresistive element 41 overlap above the sensor substrate 40 and two layers of the A phase second magnetoresistance pattern and the B phase second magnetoresistance pattern COS constituting the second magnetoresistive element 42 overlap thereabove or therebelow. Thus, in the embodiment, an area above the sensor substrate 40 in which the first magnetoresistive element 41 and the second magnetoresistive element 42 are formed can be reduced. Therefore, since a size of the sensor substrate 40 can be reduced, a size of the linear motion and rotation detector 7 can be reduced.

Also, at the time of stacking, centers of the first magnetoresistive element 41 and the second magnetoresistive element 42 in width directions thereof (directions corresponding to the direction θ around the axis of the magnetic scale 8) are matched. Thus, a width W of the stacked first magnetoresistive element 41 and second magnetoresistive element 42 in a direction corresponding to the direction θ around the axis of the magnetic scale 8 is shorter than a height H of the first magnetoresistive element 41 in a direction corresponding to the axial direction X of the magnetic scale 8. In addition, a center of the stacked first magnetoresistive element 41 and second magnetoresistive element 42 in the width direction thereof is disposed at a position in which the center thereof faces a vertex of curvature of the magnetized pattern 37 provided on the circumferential surface of the cylindrical magnetic scale 8. Therefore, it is possible to minimize an influence of a magnetic intensity portion due to a gap fluctuation caused by curvature between the magnetic scale 8 and the sensor substrate 40 on outputs of the first magnetoresistive element 41 and the second magnetoresistive element 42.

According to the linear motion and rotation detector according to the embodiment, a linear motion position and a rotational position can be detected using the magnetic scale 8. Thus, the linear motion scale and the rotational scale need not be arranged in the axial direction X. Furthermore, since the firt magnetoresistive element 41 and the second magnetoresistive element can be disposed to face the magnetized pattern 37 provided in one magnetic scale 8, the firt magnetoresistive element 41 and the second magnetoresistive element 42 can be disposed at the same position in the axial direction X. Thus, an increase in size of the linear motion and rotation detector 7 in the axial direction can be prevented.

Also, in the embodiment, since the A phase first magnetoresistance pattern SIN and the B phase first magnetoresistance pattern COS constituting the first magnetoresistive element 41 are stacked above the sensor substrate 40, a degree of freedom of disposition of the A phase first magnetoresistance pattern SIN and the B phase first magnetoresistance pattern COS above the sensor substrate 40 is increased. Similarly, since the A phase second magnetoresistance pattern SIN and the B phase second magnetoresistance pattern COS constituting the second magnetoresistive element 42 are stacked above the sensor substrate 40, a degree of freedom of disposition of the A phase second magnetoresistance pattern SIN and the B phase second magnetoresistance pattern COS above the sensor substrate 40 is increased. In addition, in the embodiment, the first magnetoresistive element 41 and the second magnetoresistive element 42 are stacked above the sensor substrate 40. Therefore, in each magnetoresistive element 41 or 42, a size of the magnetic sensor 9 can be reduced as compared with a case in which the A phase magnetoresistance pattern SIN (SIN+ or SIN−) and the B phase magnetoresistance pattern COS (COS+ or COS−) are formed above the sensor substrate 40 without being stacked or a case in which the first magnetoresistive element 41 and the second magnetoresistive element 42 are formed above the sensor substrate 40 without being stacked.

In addition, in the embodiment, the A phase first magnetoresistance pattern SIN and the B phase first magnetoresistance pattern COS constituting the first magnetoresistive element 41 are stacked above the sensor substrate 40 so that the width W1 of the first magnetoresistive element 41 in a direction corresponding to the direction θ around the axis of the magnetic scale 8 is shortened as compared with the height H1 of the first magnetoresistive element 41 in the direction corresponding to the axial direction X of the magnetic scale 8. Moreover, a center of the first magnetoresistive element 41 in the width direction thereof is disposed at a position in which the center thereof faces the vertex of the curvature of the magnetized pattern 37 provided on the circumferential surface of the cylindrical magnetic scale 8. Furthermore, the A phase second magnetoresistance pattern SIN and the B phase second magnetoresistance pattern COS constituting the second magnetoresistive element 42 are stacked above the sensor substrate 40 so that the width W2 of the second magnetoresistive element 42 in the direction corresponding to the direction θ around the axis of the magnetic scale 8 is shorter than a height H2 of the second magnetoresistive element 42 in the direction corresponding to the axial direction X of the magnetic scale 8. A center of the second magnetoresistive element 42 in the width direction thereof is disposed at a position in which the center thereof faces the vertex of the curvature of the magnetized pattern 37 provided on the circumferential surface of the cylindrical magnetic scale 8. Therefore, it is possible to minimize an influence of a magnetic intensity portion due to a gap fluctuation caused by curvature between the magnetic scale 8 and the sensor substrate 40 on outputs of the first magnetoresistive element 41 and the second magnetoresistive element 42.

Here, when an influence of a magnetic intensity portion due to a gap fluctuation caused by curvature between the magnetic scale 8 and the sensor substrate 40 is minimized, qualities of analog signals output from the first magnetoresistive element 41 and the second magnetoresistive element 42 are improved. In other words, as analog signals, outputs close to ideal sine waves can be obtained. Furthermore, when the widths W1 and W2 of the first magnetoresistive element 41 and the second magnetoresistive element 42 in the direction corresponding to the direction θ around the axis of the magnetic scale 8 are reduced, a diameter of the magnetic scale 8 can be reduced (decreased). Thus, a size of the linear motion and rotation detector 7 can be reduced.

Note that a +a phase first magnetoresistance pattern SIN+, a −a phase first magnetoresistance pattern SIN−, a +b phase first magnetoresistance pattern COS+, and a −b phase first magnetoresistance pattern COS− of a first magnetoresistive element 41 and a +a phase second magnetoresistance pattern SIN+, a −a phase second magnetoresistance pattern SIN−, a +b phase second magnetoresistance pattern COS+, and a −b phase second magnetoresistance pattern COS− of a second magnetoresistive element 42 may be stacked above a sensor substrate 40.

FIG. 7A to 7C is a diagram for describing the magnetic sensor 9 when the magnetoresistance patterns SIN+, SIN−, COS+, and COS− constituting the first magnetoresistive element 41 and the magnetoresistance patterns SIN+, SIN−, COS+, and COS− constituting the second magnetoresistive element 42 are stacked. FIG. 7A is the diagram for describing a positional relationship between a magnetic scale 8 viewed from an axial direction X and the first magnetoresistive element 41, the second magnetoresistive element 42, and the sensor substrate 40, FIG. 7B is the diagram for describing disposition of the first magnetoresistive element 41 and the second magnetoresistive element 42 on a substrate surface 40a, and FIG. 7C is the diagram schematically illustrating a cross section of the first magnetoresistive element 41 and the second magnetoresistive element 42 taken along line Z-Z in FIG. 7B.

As illustrated in FIG. 7A to 7C, when all of the magnetoresistance patterns SIN+, SIN−, COS+, and COS− constituting the first magnetoresistive element 41 and the magnetoresistance patterns SIN+, SIN−, COS+, and COS− constituting the second magnetoresistive element 42 are stacked, a size of a linear motion and rotation detector 7 can be reduced because an area above the sensor substrate 40 in which the first magnetoresistive element 41 and the second magnetoresistive element 42 are formed can be reduced. Furthermore, in this way, since widths of the first magnetoresistive element 41 and the second magnetoresistive element 42 in a direction corresponding to a direction θ around an axis of a magnetic scale 8 can be reduced, it is possible to minimize an influence of a magnetic intensity portion due to a gap G between the magnetic scale 8 and the sensor substrate 40 on an output from the first magnetoresistive element 41 and an output from the second magnetoresistive element 42. Note that an order of stacking magnetoresistance patterns can be arbitrary.

A first magnetoresistive element 41 and a second magnetoresistive element 42 may be formed on different sensor substrates. FIG. 8 illustrates a linear motion and rotation detector 7 according to a modification in which a magnetic sensor 9 includes two sensor substrates. In this case, a first sensor substrate 51 including the first magnetoresistive element 41 and a second sensor substrate 52 including the second magnetoresistive element 42 are stacked at the same position in an axial direction X and the first magnetoresistive element 41 and the second magnetoresistive element 42 can be caused to face a magnetic scale 8 (magnetized pattern 37) from a direction which is orthogonal to an axis L. Even in this case, magnetoresistance patterns SIN+, SIN−, COS+, and COS− constituting the magnetoresistive elements 41 and 42 are stacked above the sensor substrates 51 or 52 so that sizes of the formed magnetoresistive elements 41 and 42 are reduced and thus sizes of the first sensor substrate 51 and the second sensor substrate 52 can be reduced.

Here, in the above-described examples, although the magnetic sensor 9 includes magnetoresistive elements (first magnetoresistive element 41 and second magnetoresistive element 42), Hall elements can also be used in place of the magnetoresistive elements.

Also, the linear motion and rotation detector 7 can be mounted in a linear motion and rotation drive apparatus including a different drive mechanism from the linear motion and rotation drive apparatus 1. For example, the linear motion and rotation detector 7 can be mounted in a rotary linear motion drive apparatus including a linear motor that linearly moves an output shaft, a rotational motor that rotatably drives a rotating shaft, a coupling part that couples the output shaft and the rotating shaft, and a carriage for a rotary motor that supports the rotary motor to freely move in a linear motion direction, in which the output shaft is rotated through driving of the rotary motor and the rotary motor is moved to follow a linear motion of the output shaft through driving of the linear motor.

As the rotational motor, a configuration in which permanent magnets are fixed to the outer circumferential surface of the output shaft 2 and are disposed to face coils on the stator side may be adopted. In this case, the permanent magnets fixed to the outer circumferential surface of the output shaft 2 are also moved in the axial direction X along with the movement of the output shaft 2 in the axial direction X.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A linear motion and rotation detector comprising:
a cylindrical magnetic scale that moves linearly in an axial direction and rotates in a direction around an axis;
a first magnetic detection element configured to detect a linear motion position;
a second magnetic detection element configured to detect a rotational position,
wherein the magnetic scale includes a lattice-shaped magnetized pattern in which S poles and N poles are alternately arranged in the axial direction and S poles and N poles are alternately magnetized in the direction around the axis on a circumferential surface thereof in the direction around the axis,
the first magnetic detection element and the second magnetic detection element are disposed to face the magnetized pattern,
the first magnetic detection element is a magnetoresistive element and includes an A phase first magnetoresistance pattern and a B phase first magnetoresistance pattern configured to detect a linear motion of the magnetic scale with a phase difference of 90° from each other,
the second magnetic detection element is a magnetoresistive element and includes an A phase second magnetoresistance pattern and a B phase second magnetoresistance pattern configured to detect rotation of the magnetic scale with a phase difference of 90° from each other,
the A phase first magnetoresistance pattern includes a +a phase first magnetoresistance pattern and a −a phase first magnetoresistance pattern configured to detect a linear motion of the magnetic scale with a phase difference of 180°,
the B phase first magnetoresistance pattern includes a +b phase first magnetoresistance pattern and a −b phase first magnetoresistance pattern configured to detect a linear motion of the magnetic scale with a base difference of 180°,
the A chase second magnetoresistance pattern includes a +a phase second magnetoresistance pattern and a −a phase second magnetoresistance pattern configured to detect rotation of the magnetic scale with a phase difference of 180°,
the B phase second magnetoresistance pattern has a +b phase second magnetoresistance pattern and a −b phase second magnetoresistance pattern configured to detect rotation of the magnetic scale with a phase difference of 180°, and the +a phase first magnetoresistance pattern, the −a phase first magnetoresistance pattern, the +b phase first magnetoresistance pattern, the −b phase first magnetoresistance pattern, the +a phase second magnetoresistance pattern, the −a phase second magnetoresistance pattern, the +b phase second magnetoresistance pattern, and the −b phase second magnetoresistance pattern are stacked.

2. The linear motion and rotation detector according to claim 1, comprising:

a sensor substrate including the first magnetic detection element and the second magnetic detection element.

3. The linear motion and rotation detector according to claim 2, wherein the A phase first magnetoresistance pattern, the B phase first magnetoresistance pattern, the A phase second magnetoresistance pattern, and the B phase second magnetoresistance pattern are stacked above the sensor substrate.

4. The linear motion and rotation detector according to claim 2, wherein, in the first magnetic detection element, a width above the sensor substrate in a direction corresponding to the direction around the axis of the magnetic scale is shorter than a height above the sensor substrate in a direction corresponding to the axial direction of the magnetic scale, and in the second magnetic detection element, a width above the sensor substrate in a direction corresponding to the direction around the axis of the magnetic scale is shorter than a height above the sensor substrate in a direction corresponding to the axial direction of the magnetic scale.

5. The linear motion and rotation detector according to claim 4, wherein a center of the first magnetic detection element in a width direction thereof and a center of the second magnetic detection element in a width direction thereof above the sensor substrate face a vertex of curvature of the magnetic scale.

6. The linear motion and rotation detector according to claim 1, comprising:

a first sensor substrate including the first magnetic detection element, wherein the A phase first magnetoresistance pattern and the B phase first magnetoresistance pattern are stacked above the first sensor substrate.

7. The linear motion and rotation detector according to claim 6, wherein, in the first magnetic detection element, a width above the first sensor substrate in a direction corresponding to the direction around the axis of the magnetic scale is shorter than a height above the first sensor substrate in a direction corresponding to the axial direction of the magnetic scale.

8. The linear motion and rotation detector according to claim 7, wherein a center of the first magnetic detection element above the first sensor substrate in a width direction thereof faces a vertex of curvature of the magnetic scale.

9. The linear motion and rotation detector according to claim 6, comprising:

a second sensor substrate including the second magnetic detection element, wherein the A phase second magnetoresistance pattern and the B phase second magnetoresistance pattern are stacked above the second sensor substrate.

10. The linear motion and rotation detector according to claim 9, wherein, in the second magnetic detection element, a width above the second sensor substrate in a direction corresponding to the direction around the axis of the magnetic scale is shorter than a height above the second sensor substrate in a direction corresponding to the axial direction of the magnetic scale.

11. The linear motion and rotation detector according to claim 10, wherein a center of the second magnetic detection element above the second sensor substrate in a width direction thereof faces a vertex of curvature of the magnetic scale.

* * * * *